(12) United States Patent
Bergman Reuter et al.

(10) Patent No.: US 7,552,417 B2
(45) Date of Patent: *Jun. 23, 2009

(54) SYSTEM FOR SEARCH AND ANALYSIS OF SYSTEMATIC DEFECTS IN INTEGRATED CIRCUITS

(75) Inventors: Bette L. Bergman Reuter, Essex Junction, VT (US); David L. DeMaris, Austin, TX (US); Mark A. Lavin, Katonah, NY (US); William C. Leipold, Enosburg Falls, VT (US); Daniel N. Maynard, Craftsbury Common, VT (US); Maharaj Mukherjee, Wappingers Falls, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/132,710

(22) Filed: Jun. 4, 2008

(65) Prior Publication Data

US 2008/0232675 A1 Sep. 25, 2008

Related U.S. Application Data

(60) Continuation of application No. 11/748,575, filed on May 15, 2007, now Pat. No. 7,415,695, which is a division of application No. 10/605,849, filed on Oct. 30, 2003, now Pat. No. 7,284,230.

(51) Int. Cl.
*G06F 17/50* (2006.01)
(52) U.S. Cl. .................... 716/21; 716/4; 716/5; 716/19
(58) Field of Classification Search ............ 716/4, 716/5, 19, 21
See application file for complete search history.

(56) References Cited

U.S. PATENT DOCUMENTS 4,855,253 A 8/1989 Weber (Continued)

FOREIGN PATENT DOCUMENTS

JP 10-301257 11/1998

OTHER PUBLICATIONS

Friedman, et al., "Model-Free Estimation of Defect Clustering in Integrated Circuit Fabrication," IEEE Transactions on Semiconductor Manufacturing, vol. 10, No. 3, Aug. 1997, pp. 344-359.

*Primary Examiner*—Sun J Lin
(74) *Attorney, Agent, or Firm*—Gibb I.P. Law Firm, LLC; Richard M. Kotulak, Esq.

(57) ABSTRACT

Disclosed is a method of locating systematic defects in integrated circuits. The invention first performs a preliminary extracting and index processing of the circuit design and then performs feature searching. When performing the preliminary extracting and index processing the invention establishes a window grid for the circuit design and merges basis patterns with shapes in the circuit design within each window of the window grid. The invention transforms shapes in a each window into feature vectors by finding intersections between the basis patterns and the shapes in the windows. Then, the invention clusters the feature vectors to produce an index of feature vectors. After performing the extracting and index processing, the invention performs the process of feature searching by first identifying a defect region window of the circuit layout and similarly merging basis patterns with shapes in the defect region window. This merging process can include rotating and mirroring the shapes in the defect region. The invention similarly transforms shapes in the defect region window into defect vectors by finding intersections between basis patterns and the shapes in the defect region. Then, the invention can easily find feature vectors that are similar to the defect vector using, for example, representative feature vectors from the index of feature vectors. Then, the similarities and differences between the defect vectors and the feature vectors can be analyzed.

7 Claims, 5 Drawing Sheets

U.S. PATENT DOCUMENTS

| | | |
|---|---|---|
| 5,544,256 A | 8/1996 | Brecher et al. |
| 5,923,430 A | 7/1999 | Worster et al. |
| 5,983,237 A | 11/1999 | Jain et al. |
| 6,021,214 A | 2/2000 | Evans et al. |
| 6,140,140 A | 10/2000 | Hopper |
| 6,189,130 B1 | 2/2001 | Gofman et al. |
| 6,285,783 B1 | 9/2001 | Isomura et al. |
| 6,650,779 B2 | 11/2003 | Vachtesvanos et al. |
| 6,728,391 B1 | 4/2004 | Wu et al. |
| 2003/0076989 A1 | 4/2003 | Maayah et al. |

SYSTEM FOR SEARCH AND ANALYSIS OF SYSTEMATIC DEFECTS IN INTEGRATED CIRCUITS

CROSS-REFERENCE TO RELATED APPLICATIONS

This application is a continuation of U.S. application Ser. No. 11/748,575 filed May 15, 2007, which issued as U.S. Pat. No. 7,415,695, which is a divisional of U.S. application Ser. No. 10/605,849 filed Oct. 30, 2003, which issued as U.S. Pat. No. 7,284,230, the complete disclosure of which, in its entirety, is herein incorporated by reference.

BACKGROUND OF THE INVENTION

1. Field of the Invention

The present invention generally relates to a system for identifying and analyzing systematic defects in integrated circuits.

2. Description of the Related Art

Systematic defects in a semiconductor process are those defects which are not a result of particles interfering with exposure or other process steps during manufacturing. Instead, systematic defects relate to layout design flaws or processing design flaws and will occur regularly at the same location within a finished product. Yield characterization engineers face a difficult task in identifying the cause of such defects. Particularly, in modern processes requiring resolution enhancement, chemo-mechanical polishing and other complex steps, the root cause often involves the interaction of a particular local pattern with the shapes in its context. The same pattern which results in a deterministic fail (or is not robust to process variations) in a particular part may not fail in other locations on the same design, or on a different design.

SUMMARY OF INVENTION

The invention provides a method of locating shapes similar to those which induce pattern-dependent systematic defects in integrated circuits. The invention first performs a preliminary extraction and index processing of the circuit design and then performs feature based searching.

When performing the preliminary extraction and index processing, the invention establishes a window grid for the circuit design and merges basis patterns with shapes in the circuit design aligned with each window of the window grid. The invention transforms shapes in each window into feature vectors by finding intersections between the basis patterns and the shapes in the windows. Then, the invention clusters the feature vectors to produce an index of feature vectors. This comparing operates on the basis of one or more adjacent layout levels. An index will typically have multi-clusters centered on defect layers.

Alternatively, the regular grid of windows is replaced by a randomly placed set of windows, in order to avoid any spatial phase correlations of windows to patterns and to control the amount of data processed and retained for the indexing and search process.

After performing the extracting and index processing, the invention performs the process of feature searching by first identifying a defect region window of the circuit layout and similarly merging basis patterns with shapes in the defect region window. This merging process can include transforming, rotating and mirroring the layout shapes in the defect region. The invention similarly transforms shapes in the defect region window into defect vectors by finding intersections between basis patterns and the shapes in the defect region to facilitate searching. Then, the invention can easily find feature vectors that are similar to the defect vector using, for example, representative feature vectors from the index of feature vectors. Then, the similarities and differences between the defect vectors and the other feature vectors can be analyzed.

Before the comparing process, the invention can perform adaptive sampling on the feature vectors to eliminate redundant feature vectors. After the comparing process, the invention stores the feature vectors and the index in a database, wherein the database is used for multiple different feature searching processes. The invention also maintains coordinate location information of the windows corresponding to each feature vectors within the circuit design.

The extracting and index processing is performed for a first window size and can be repeated for different window sizes. Thus, the process of finding feature vectors uses feature vectors produced from a window size matching a window size of the defect shape and its immediate context of surrounding shapes.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

The foregoing invention will be better understood from the following detailed description with reference to the drawings, in which.

DETAILED DESCRIPTION

Figure 1:
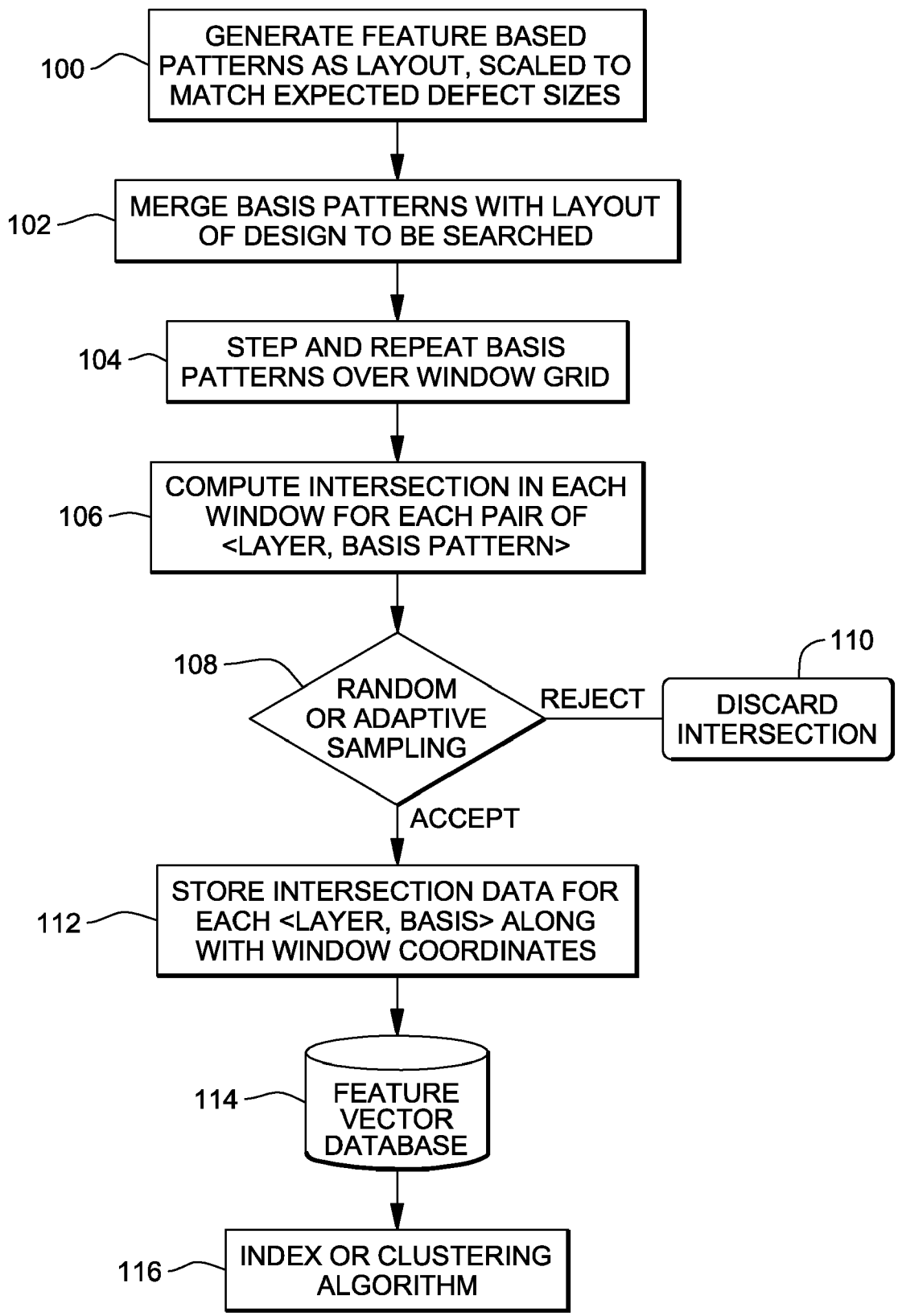
FIG. 1 is a flowchart illustrating one aspect of the invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail.

As mentioned above, yield characterization engineers face a difficult task in identifying the cause of systematic defects. The problem faced by the engineers encountering a systematic failure is formulated as a search task. With the invention, feature vectors of defect shapes and nearby shape context (defect vectors) are compared to a previously established database of feature vectors for the circuit to see whether systematic failures occur in areas where similar patterns to the defect shapes and context exist.

A sorted set of regions ranging from most similar to quantitatively less similar is retrieved. Once these regions of interest have been identified, an analysis can be performed to determine what is different about the similar but non-failing patterns, or what is common among the failing patterns. Corrective action can then be taken, either in the form of process adjustments or updated design rules.

The process of searching for similar regions is accomplished using two separate stages. The first stage is a feature extraction and indexing process to create the database of feature vectors (shown in FIG. 1). This first process is used to analyze each candidate design which may be searched at some later time. The first process transforms layout data into a form which can be searched, with indexing to improve the efficiency of searches. An indexing process may be used to improve performance of the search process, but is not necessary, and may be bypassed when the assumptions on region size and relevant layers used for indexing are not met. The second process (shown in FIG. 2) applies feature extraction. This second process locates defects and provides a context for the defect, including shapes on the same layer and on adjacent layers which are hypothesized to be relevant to the defect.

Thus, the invention first performs a preliminary extracting and index processing of the circuit design and then performs feature searching. When performing the preliminary extracting and index processing the invention establishes a window grid for the circuit design and merges basis patterns with shapes in the circuit design within each window of the window grid. The invention transforms shapes in each window into feature vectors by finding intersections between the basis patterns and the shapes in the windows. The ratio of the area of intersection with the basis pattern in each window to the area of the window is saved, with each basis pattern and layer contributing one field to a vector associated with the window. Then, the invention optionally clusters or compares the feature vectors to produce an index of feature vectors. It is possible to do searching and distance ranking without clustering. The basic capability of feature extraction and returning matching searches sorted by distance is not absolutely dependent on clustering. This preliminary processing is performed before any defects are discovered. Therefore, while this first processing may be somewhat slow or computationally intensive, because it is performed well before any searching or other similar processing (e.g., because it is done "offline") this extracting and indexing does not decrease the performance of the searching aspect of the invention. Indeed, because the invention creates the indexed database of feature vectors before the searching process, it makes the searching process substantially faster. The preliminary extracting and index processing is shown in greater detail below with respect to FIG. 1.

Figure 3:
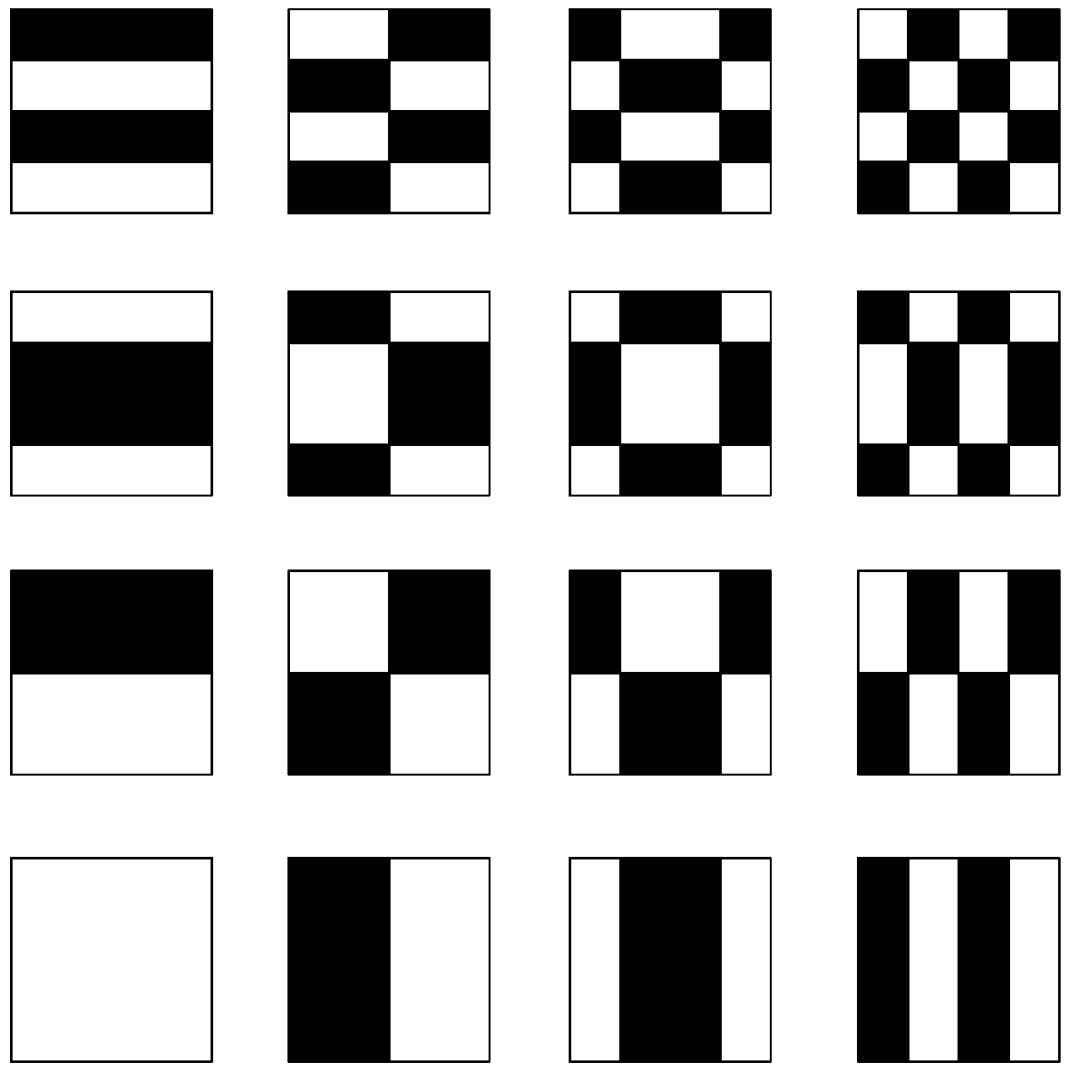
FIG. 3 is a schematic diagram of an example of basis patterns used by the invention.

As shown in FIG. 1, the feature extraction and indexing process begins with item 100 where feature basis patterns are generated as a layout. A set of feature patterns is chosen which can be composed to generate rectilinear layouts. Walsh Patterns, two dimensional patterns derived from a Hadamard matrix by rotations and multiplications, are one suitable pattern set. In FIG. 3, the Walsh Patterns are an example of a pattern set (basis pattern) used for feature analysis by intersection with the circuit design layout. While this specific pattern is used in this example, as would be understood by one ordinarily skilled in the art, a wide variety of patterns could be utilized and the invention is not limited to the basis patterns shown in FIG. 3.

The patterns shown in FIG. 3 are derived originally from a 4×4 Hadamard matrix with rows that are replicated and expanded to form the bottom row. These matrices are rotated to form the leftmost column, with the remaining matrices formed by multiplying this row and column matrix set to produce 16 basis patterns. The feature patterns in the set are scaled to match the typical window size of the anticipated failed structures. As would be readily understood by one ordinarily skilled in the art, the patterns used herein are merely examples and any similar form of patterns used for feature detection could be used with the invention.

Figure 4:
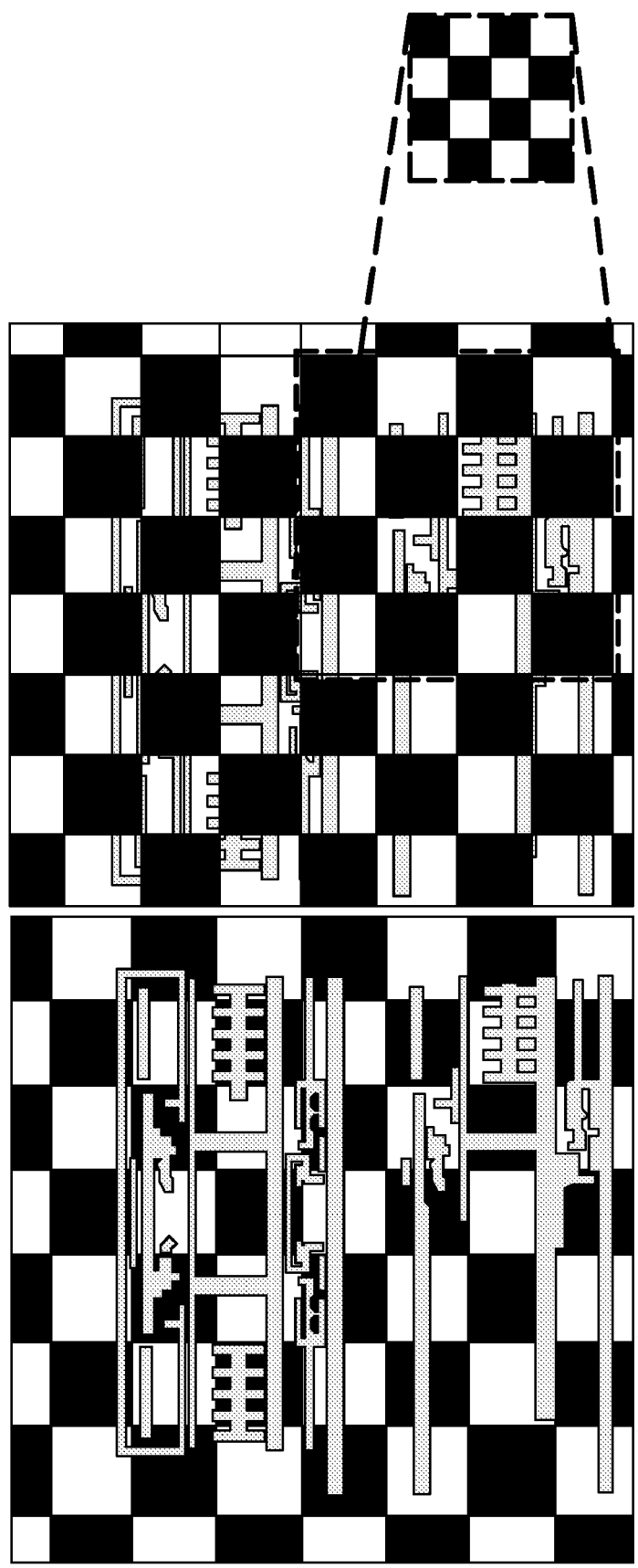
FIG. 4 is a schematic diagram of basis patterns overlaid on an integrated circuit.

Next, as shown in item 102, the layers of the design are merged with the basis patterns. Then, as shown in item 104, the feature patterns are replicated across the design, or described in a geometric data structure which allows intrusion checking based on a step-and-repeat transform (as shown in FIG. 4). In this process, the invention could perform pattern recognition upon an entire circuit design or on limited portions of the entire circuit design, depending upon various design constraints. FIG. 4 also shows that an intersection is performed of the shapes on each pair of layer and replicated feature pattern sets (item 106).

The relative area of intersection for all levels each region of interest is stored. Therefore, the intersection of light and dark shapes of the basis patterns and the light and dark shapes of the devices, wiring, and vias on one or more layers within the circuit design constitute a vector. This vector is termed a "feature vector" and comprises a numerical representation of the shape or combination of shapes within the window. The summed fractional intersection area relative to the window size area of each basis pattern and layout level are stored as one numerical field as a feature vector for each window, and represents all shapes within that window. The set of intersection areas for each layer-pattern pair constitutes a feature vector.

The coordinates of each window are stored along with the feature vector in the feature database (item 112). The database holds the feature vectors and coordinates for all windows on the design. As would be understood by one ordinarily skilled in the art of, some windows may overlap. The extracting and index processing is performed for a first window size and can be repeated for different window sizes. The process of finding feature vectors (discussed below) uses feature vectors that have a window size matching or approximating the window size of the defect region.

Since the number of windows can be vary large, sampling of the input data can be specified during the design feature extraction (item 108) to eliminate unnecessary feature vectors, such as redundant feature vectors or anomalies. By sampling, only subsets of the windows are chosen for feature extraction and storage in the database 114. A tradeoff can be made between the savings in storage (by sampling a smaller percentage) and the risk of missing some similar data, or limiting the increments of similarity from the search target. The sampling of the data may be adaptive, with patterns rejected based on similarity to existing stored feature vectors. In this case, a simple similarity metric such as Euclidean distance or cosine angle distance may be used. Those intersections that are rejected during the sampling process are discarded (item 110). Alternatively, rejected window coordinates, or indices which can be mapped to coordinates, may be saved in some data structure to indicate that they are represented by an archetypal window. The database is further processed (indexed) via some comparing scheme 116. The self-organized map network is one suitable indexing scheme. As would be readily understood by one ordinarily skilled in the art, the comparing techniques used herein are merely examples and any similar form of patterns used for feature detection could be used with the invention.

Figure 2:
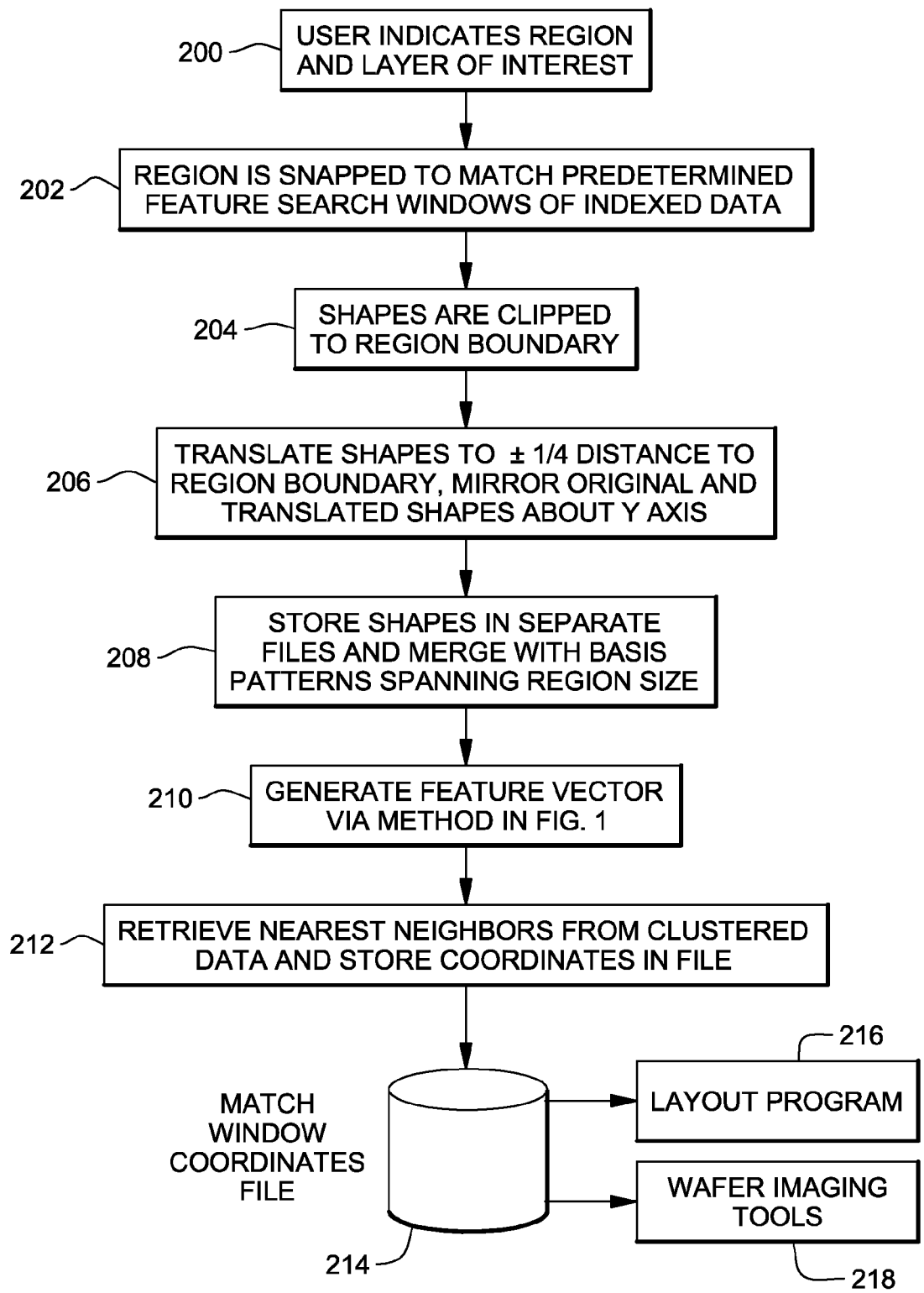
FIG. 2 is a flowchart illustrating one aspect of the invention.

As mentioned previously, FIG. 1 describes the feature extraction and indexing portion of the invention. FIG. 2 illustrates the search feature extraction that is performed using the results from the feature extraction and indexing process. Thus, after performing the extracting and index processing, the invention performs the process of feature searching by first identifying a defect region window of the circuit layout and similarly merging basis patterns with shapes in the defect region window. This merging process can include rotating and mirroring the shapes in the defect region. The invention similarly transforms shapes in the defect region window into defect vectors by finding intersections between basis patterns and the shapes in the defect region. Then, the invention can easily find feature vectors that are similar to the defect vector using, for example, representative feature vectors from the index of feature vectors. Then, the similarities and differences between the actual shapes represented by defect vectors and those shapes represented by the feature vectors can be analyzed. It may be important to analyze both the shapes as designed and as produced by the manufacturing process.

More specifically, as shown in item 200 in FIG. 2, the search-target layout (e.g., the region containing the defect) is selected by the designer in an interactive layout environment, by specifying coordinates and relevant layers of the defect. In item 202, the search-target layout window size is matched with the nearest pre-designated window size in the index created during the extraction and indexing processing above.

Shapes in the search target layout region are clipped to the region boundary (204) such that the bounds of the shapes correspond exactly the size of one window in the previously saved database. The shape are saved to a file, and merged with the feature pattern set (208).

For smaller patterns composed of specific interactions, variations of the target shapes (e.g., defect shapes and immediate context) are generated with shift, mirror and rotate transforms to allow the target to be recognized when the target falls in different locations or orientations with respect to windows extracted and indexed by the method described above (item 206). The data is merged with the appropriate scale feature patterns in item 208. Thus, as was performed above, the basis patterns are merged with the shapes in the defect region and the invention similarly transforms shapes in the defect region window into defect vectors by finding intersections between basis patterns and the shapes in the defect region. The intersection process is again used to generate a feature vector for each of the defect shapes, in item 210.

The resulting feature vector of the defect (e.g., defect vector) is matched against the database of other feature vectors from the same design or other circuit designs, created during the extraction and indexing process. By searching the index structure, the invention can return the best cluster of feature vectors in item 212. For example, in the self-organized map, each vector is matched against all representative vectors, and the best several matching representative vector or cluster are returned. The search may be controlled by expanding to nearby, but more distant-matching clusters. The feature database vectors indexed by each matching cluster are sorted by distance to the defect vector, and the total set of such matches are divided into bins by distance. The stored window coordinates of all feature database vectors corresponding to the defect data are returned by the system, in separate files or other structures by bin 214. Also, ranking of the similarity between the clustered vectors and the defect vector can be produced.

The user may then visually inspect the actual shapes by controlling the layout editor 216. The search process may be repeated by incrementally expanding or narrowing the search, or limiting the number of matches from each cluster. The presentation may group returned matches into bins ranked according to similarity to the target. The user may control the number of results in each bin with a search parameter. The regions returned may also be used to control wafer inspection tools 218, imaging systems, or other hardware analysis tools 218.

The uses of the search process include, but are not limited to Producing a range of patterns to be examined in silicon by engineers, in order to refine the hypotheses about the root cause and take corrective action. The invention returns a set of regions which can be classified as defect/non-defect, which may then serve to support feature analysis by discriminate methods or other data mining methods to automatically identify the features which best discriminate the failure class. The invention can identify similar patterns on designs or design components (such as circuit libraries or processor cores) not yet manufactured which might be subject to similar failures. The invention can rank the likelihood of failure of patterns based on similarity to known defect patterns, in order to apply automatic or manual corrections to layout.

Figure 5:
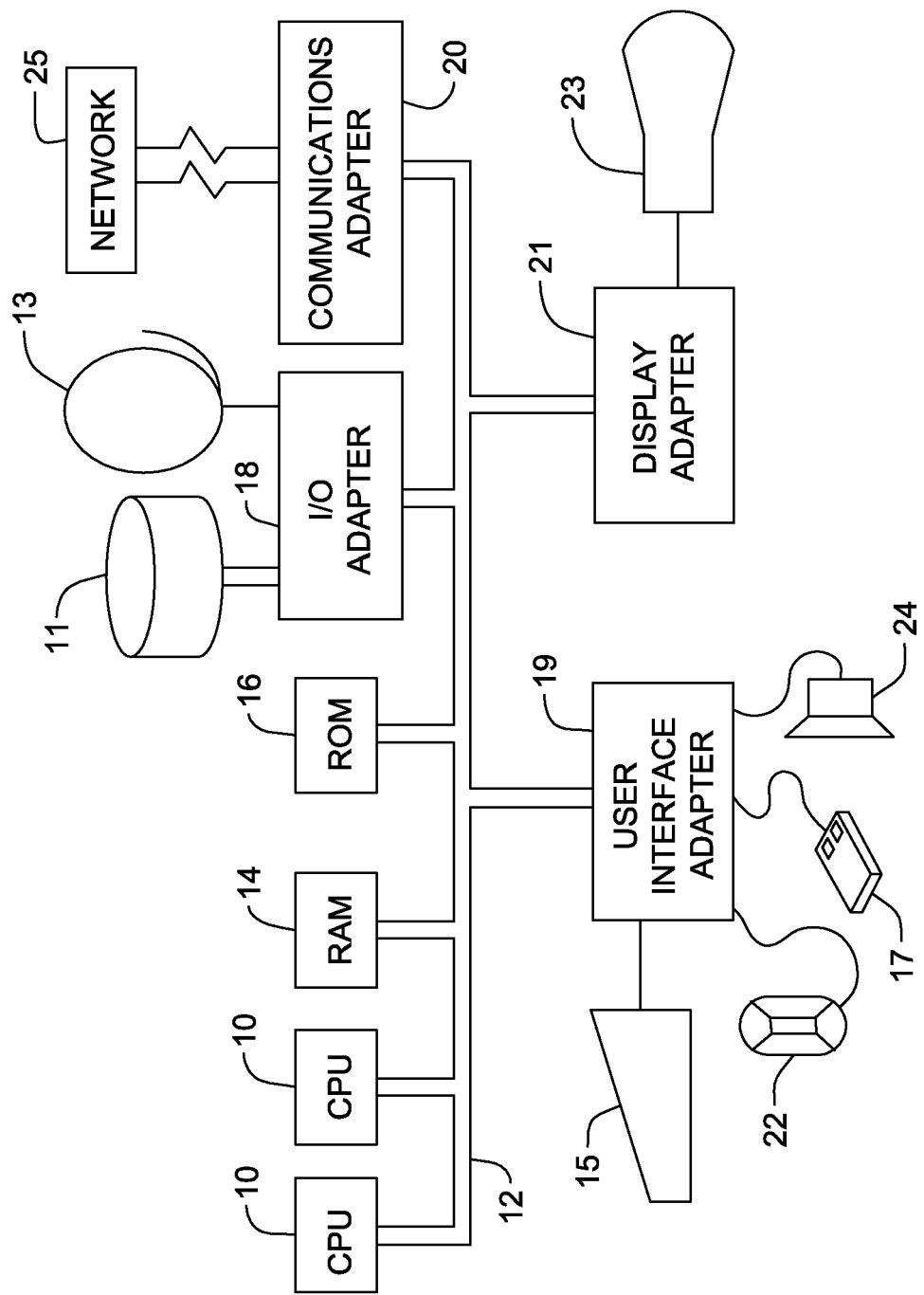
FIG. 5 is a hardware embodiment of the invention.

A representative hardware environment for practicing the present invention is depicted in FIG. 5, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

Therefore, by performing the extraction and indexing process before beginning any type of defect searching, the invention completes the relatively slow and cumbersome aspect of creating the feature vectors (and clusters of feature vectors) without impacting the searching process. This makes the searching process quicker and more effective because the searching process only needs to translate the defect shapes into feature vectors. Then, the searching process merely needs to compare these defect vectors against the previously established database of clustered feature vectors of the remaining shapes in the circuit design. Because of these features, the invention performs the searching process more efficiently, faster, and utilizes less resources.

One benefit of the invention is the ability to search within the same integrated circuit design, or other circuit designs, for patterns (localized shapes on one or more levels) which are similar to a defect shape and local pattern. The quantitative identification of distance of such patterns from the target represents a key improvement from previously used pass/fail screen methods, which do not provide distance measures and may need to be iteratively refined to produce an acceptable result. Unlike the invention, such special purpose screens cannot be performed offline, thus the present invention greatly reduces the turn-around-time to identify matching regions.

While the invention has been described in terms of preferred embodiments, those skilled in the art will recognize that the invention can be practiced with modification within the spirit and scope of the appended claims.

What is claimed is:

1. A program storage device readable by a machine, tangibly embodying a program of instructions executable by the machine to perform a method of locating systematic defects in integrated circuits, said method comprising:
    performing preliminary extracting and index processing of a circuit design comprising:
        transforming shapes in a circuit layout into feature vectors; and
        comparing said feature vectors to produce an index of feature vectors; and
    after performing said preliminary extracting and index processing, performing a process of feature searching comprising:
        identifying a defect region of said circuit layout;
        transforming shapes in said defect region into defect vectors; and
        finding feature vectors that are similar to said defect vectors using said index of feature vectors.

2. The program storage device in claim 1, further comprising analyzing similarities and differences between manufactured shapes represented by said defect vectors and manufactured shapes represented by said feature vectors that are similar to said defect vectors.

3. The program storage device in claim 1, further comprising, after said comparing process, storing said feature vectors and said index in a database, wherein said database is used for multiple different features searching processes.

4. The program storage device in claim 1, further comprising, before said comparing process, performing sampling on said feature vectors to eliminate redundant feature vectors.

5. The program storage device in claim 1, further comprising maintaining coordinate location information of said feature vectors within said circuit design.

6. The program storage device in claim 1, wherein said preliminary extracting and index processing is performed for a first window size and, wherein said method further comprises repeating said preliminary extracting and index processing for different window sizes.

7. The program storage device in claim 6, wherein said process of finding feature vectors comprises using feature vectors that have a window size matching a window size of said defect region.

* * * * *